US009392137B2

(12) United States Patent
Okado (10) Patent No.: US 9,392,137 B2
(45) Date of Patent: Jul. 12, 2016

(54) IMAGE READING DEVICE AND IMAGE FORMING APPARATUS

(71) Applicant: KYOCERA Document Solutions Inc., Osaka-shi (JP)

(72) Inventor: Makoto Okado, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/801,758

(22) Filed: Jul. 16, 2015

(65) Prior Publication Data

US 2016/0037012 A1    Feb. 4, 2016

(30) Foreign Application Priority Data

Jul. 29, 2014 (JP) ................................. 2014-154219

(51) Int. Cl.
*H04N 1/04* (2006.01)
*H04N 1/10* (2006.01)

(52) U.S. Cl.
CPC .................................. *H04N 1/1013* (2013.01)

(58) Field of Classification Search
CPC .................. H04N 1/00411; H04N 2201/0094; H04N 1/00408; H04N 1/00681; H04N 1/00708; H04N 1/00779; H04N 1/33315; H04N 2201/33321; H04N 2201/3205
USPC ............... 358/1.14, 1.13, 1.15, 1.9, 448, 504, 358/449, 450, 451, 501; 709/203, 248, 220, 709/224; 399/81, 10, 11, 27, 29, 365, 381, 399/383, 50, 51, 53, 55, 56, 58, 59, 60, 61, 399/64, 69, 8, 94, 97, 99
See application file for complete search history.

(56) References Cited

U.S. PATENT DOCUMENTS

| 5,752,127 | A | * | 5/1998 | Okado | G03G 15/041 399/201 |
|---|---|---|---|---|---|
| 5,895,139 | A | * | 4/1999 | Osaka | G03G 15/221 399/139 |
| 5,920,749 | A | * | 7/1999 | Sugaya | G03G 15/2003 399/69 |
| 5,956,540 | A | * | 9/1999 | Takeda | G03G 15/221 347/3 |
| 5,975,799 | A | * | 11/1999 | Carrigan | B09C 1/06 166/248 |
| 6,388,690 | B1 | * | 5/2002 | Kurachi | B41J 2/3555 347/180 |
| 8,374,406 | B2 | * | 2/2013 | Higuchi | G06K 9/0004 382/124 |

(Continued)

FOREIGN PATENT DOCUMENTS

JP    2003-089237 A    3/2003

*Primary Examiner* — Negussie Worku
(74) *Attorney, Agent, or Firm* — Studebaker & Brackett PC (57) ABSTRACT

An image reading device includes a reading unit, a drive section, an operation control section, an acquiring section, and a casing. The drive section moves the reading unit. The operation control section controls a drive operation by the drive section and a light emitting operation by a light emitting section. The acquiring section acquires status information indicating a state of the device. The casing constitutes an outer contour of the device. The casing has a symbol inscribed on a predetermined portion therein. The symbol corresponds to the status information item. When the acquiring section acquires the status information item, the operation control section controls the drive section to move the reading unit to a position corresponding to the portion on which the symbol corresponding to the status information item is inscribed and controls the light emitting section to emit light while the reading unit is located at the position.

16 Claims, 7 Drawing Sheets

(56) References Cited

U.S. PATENT DOCUMENTS

| | | | | |
|---|---|---|---|---|
| 8,514,460 B2* | 8/2013 | Miyagawa | ......... | H04N 1/00002 358/448 |
| 2006/0250645 A1* | 11/2006 | Miyazaki | .............. | G06F 3/1207 358/1.15 |
| 2011/0235107 A1* | 9/2011 | Sakata | ................. | H04N 1/0035 358/1.15 |
| 2013/0113823 A1* | 5/2013 | Umezawa | .......... | H04N 1/00424 345/619 |
| 2015/0371126 A1* | 12/2015 | Ota | .................... | G06K 15/1806 358/1.14 |

* cited by examiner

IMAGE READING DEVICE AND IMAGE FORMING APPARATUS

INCORPORATION BY REFERENCE

The present application claims priority under 35 U.S.C. §119 to Japanese Patent Application No. 2014-154219, filed Jul. 29, 2014. The contents of this application are incorporated herein by reference in their entirety.

BACKGROUND

The present disclosure relates to an image reading device and an image forming apparatus including an image reading device, and particularly relates to a technique for notifying a user of an apparatus state.

An image reading device (e.g., a scanner) and an image forming apparatus including such an image reading device usually include a display section (e.g., a liquid crystal display (LCD)) in the front of a casing thereof. The display section displays status information. The status information indicates a state of the device or the apparatus. For example, when a jam (e.g., paper jam) occurs in the image forming apparatus, the display section displays occurrence of the jam or the position at which the jam occurs. The image reading device or the image forming apparatus notifies a user of a state of the device or the apparatus through the display section displaying the status information.

SUMMARY

An image reading device according to the present disclosure includes a casing, a contact glass, a document pressing member, a reading unit, a drive section, an operation control section, and an acquiring section. The casing constitutes an outer contour of the image reading device. An original document that is a to-be-read target is loaded on the contact glass. The document pressing member is openable and closable and located on one side of the contact glass. The reading unit includes a light emitting section and a light receiving section. The light emitting section is movable in a sub-scanning direction and located on an opposite side of the contact glass and emits light toward the original document. The light receiving section receives the light that is reflected by the original document. The drive section moves the reading unit in the sub-scanning direction. The operation control section controls a drive operation by the drive section and a light emitting operation by the light emitting section. The acquiring section acquires a status information item indicating a state of the image reading device or an apparatus connected with the image reading device. The casing has a symbol inscribed on a predetermined portion in the casing. The symbol corresponds to the status information item. When the acquiring section acquires the status information item, the operation control section controls the drive section to move the reading unit to a position corresponding to the portion on which the symbol corresponding to the status information item is inscribed and controls the light emitting section to emit light while the reading unit is located at the position.

DETAILED DESCRIPTION

Figure 1:
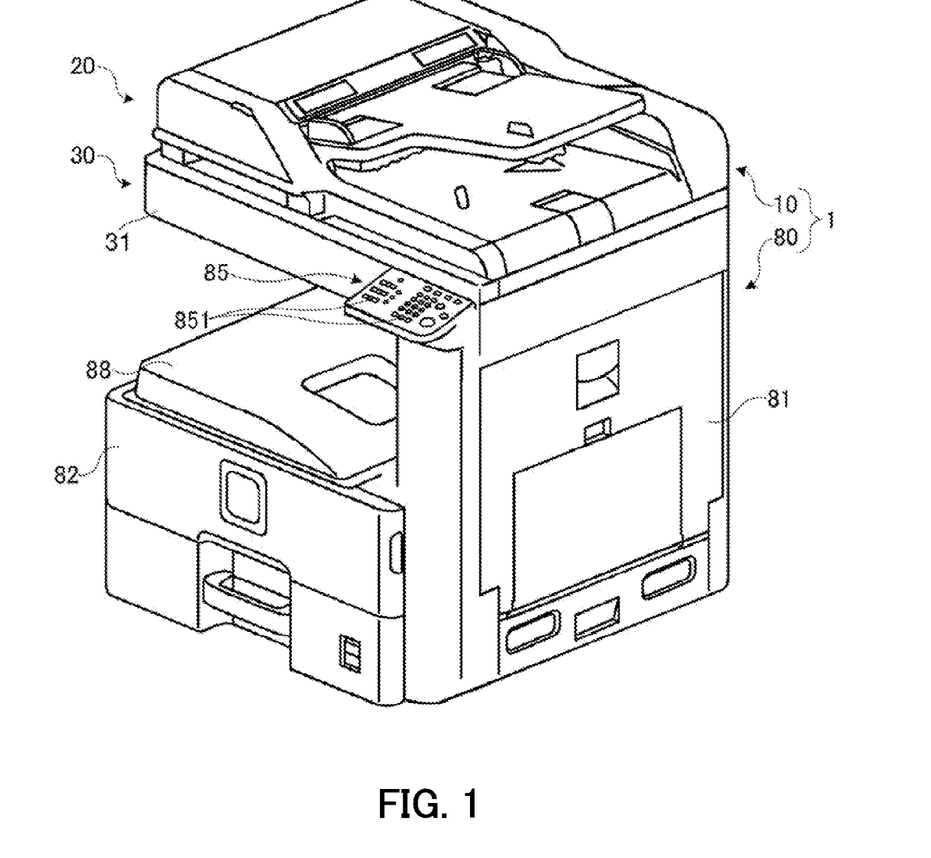
FIG. 1 is a perspective view illustrating an image forming apparatus including an image reading device according to one embodiment of the present disclosure.
Figure 2:
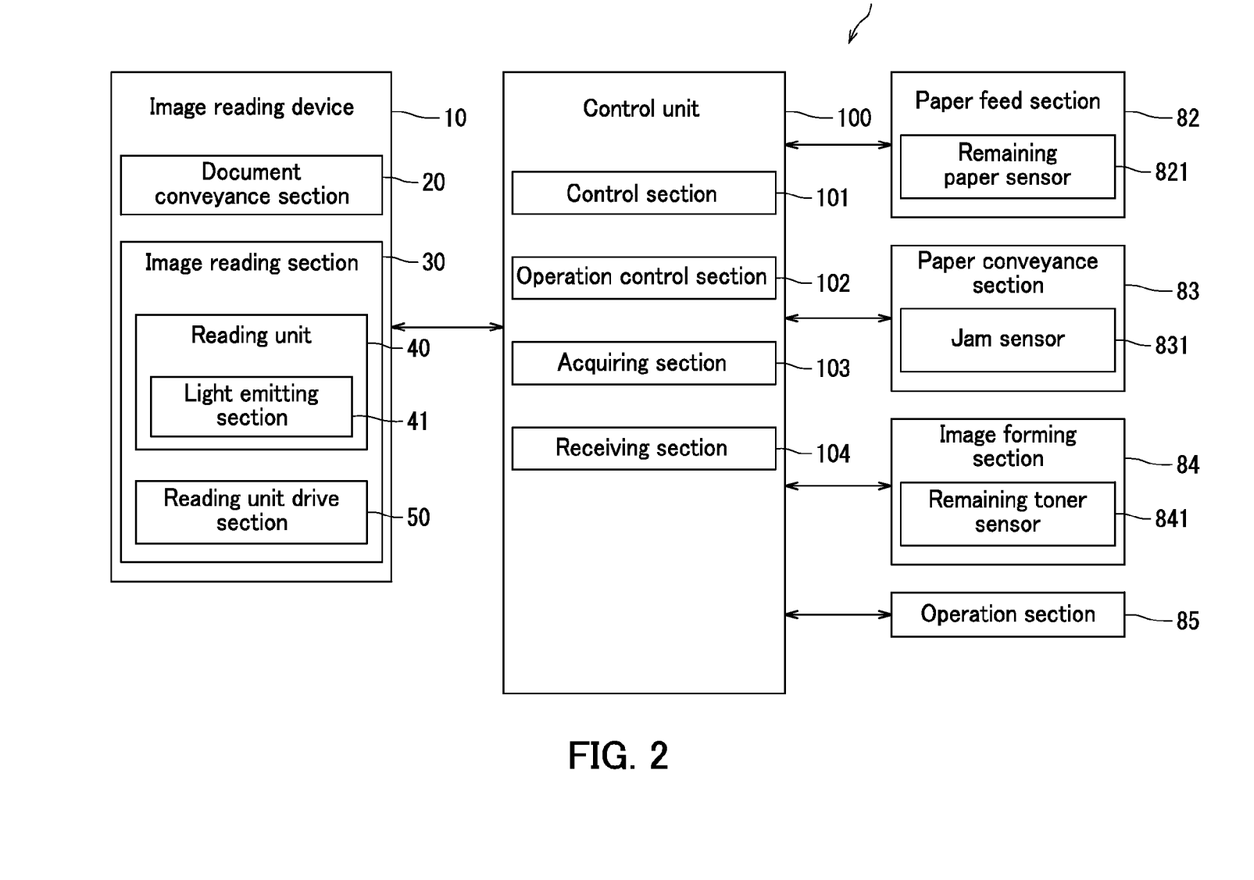
FIG. 2 is a block diagram illustrating an internal configuration of the image forming apparatus including the image reading device according to one embodiment of the present disclosure.

An image reading device and an image forming apparatus including the image reading device according to one embodiment of the present disclosure will be described below with reference to the accompanying drawings. FIG. 1 is a perspective view illustrating an image forming apparatus including an image reading device according to one embodiment of the present disclosure. FIG. 2 is a block diagram illustrating an internal configuration of the image forming apparatus including the image reading device according to one embodiment of the present disclosure.

An image forming apparatus 1 is a multifunction peripheral having a plurality of functions including, for example, fax a communication function, a copy function, a print function, and a scan function. As illustrated in FIG. 1, the image forming apparatus 1 includes a main body 80 and an image reading device 10. The image reading device 10 is arranged above the main body 80.

The main body 80 includes a housing 81. The housing 81 constitutes an outer contour of the main body 80. A paper feed section 82, a paper conveyance section 83, an image forming section 84, etc. are housed in the interior of the housing 81.

The paper feed section 82 includes a paper feed cassette (not illustrated) and a feed roller (not illustrated). The paper feed cassette accommodates paper. The feed roller feeds the paper accommodated in the paper feed cassette toward a paper conveyance path arranged in the interior of the housing 81. A remaining paper sensor 821 is arranged in the interior of the paper feed cassette. The remaining paper sensor 821 may be a reflective sensor, for example. The reflective sensor includes a light emitter and a photo detector. The remaining paper sensor 821 is arranged so that its main emission direction is directed to the paper accommodated in the paper feed cassette. Light emitted from the light emitter is reflected by the paper and received by the photo detector. The remaining paper sensor 821 outputs a signal corresponding to a light quantity of the light received by the photo detector to an acquiring section 103 of a control unit 100, which will be described later.

The paper conveyance section 83 includes a plurality of conveyance roller pairs (not illustrated) and a drive section (not illustrated). The conveyance roller pairs are arranged at appropriate points along the paper conveyance path. The drive section drives and rotates the conveyance roller pairs.

The paper conveyance section 83 conveys the paper fed from the paper feed section 82 to the image forming section 84. The paper conveyance section 83 further includes a plurality of jam sensors 831. The jam sensors 831 are arranged at appropriate points along the paper conveyance path. The jam sensors 831 each are a reflective sensor, for example, likewise the aforementioned remaining paper sensor 821. The jam sensors 831 each are arranged so that its main emission direction is directed to a predetermined point in the paper conveyance path. A reflecting mirror is located opposite to each of the jam sensors 831 with the paper conveyance path therebetween. In the absence of paper from a predetermined point in the paper conveyance path, light emitted from a light emitter is reflected by the reflecting mirror and received by a photo detector. By contrast, in the presence of paper at the predetermined point in the paper conveyance path, the light emitted from the light emitter is blocked by the paper, and therefore, is not received by the photo detector. The jam sensors 831 each output to the acquiring section 103 a signal according to whether or not the photo detector receives the light.

The image forming section 84 includes a photosensitive drum (not illustrated), a charger (not illustrated), an exposure device (not illustrated), a developing device (not illustrated), etc. The image forming section 84 forms a toner image of an original document read by the image reading device 10 on the photosensitive drum through charging, exposure, and development. The toner image formed on the photosensitive drum is transferred to the paper conveyed by the paper conveyance section 83. The paper undergoes fixing and is then ejected onto an exit tray 88. The image forming section 84 further includes a toner container (not illustrated). The toner container contains a toner. A remaining toner sensor 841 is arranged on a wall surface of the toner container. The remaining toner sensor 841 may be an eddy current sensor, for example. The remaining toner sensor 841 outputs a voltage signal in proportion a pressure that the toner applies to the wall surface of the toner container.

An operation section 85 is arranged in the front of the housing 81. The operation section 85 includes a plurality of operation keys 851, for example. The operation keys 851 include a start key to instruct execution of an image reading job and the like.

Figure 3:
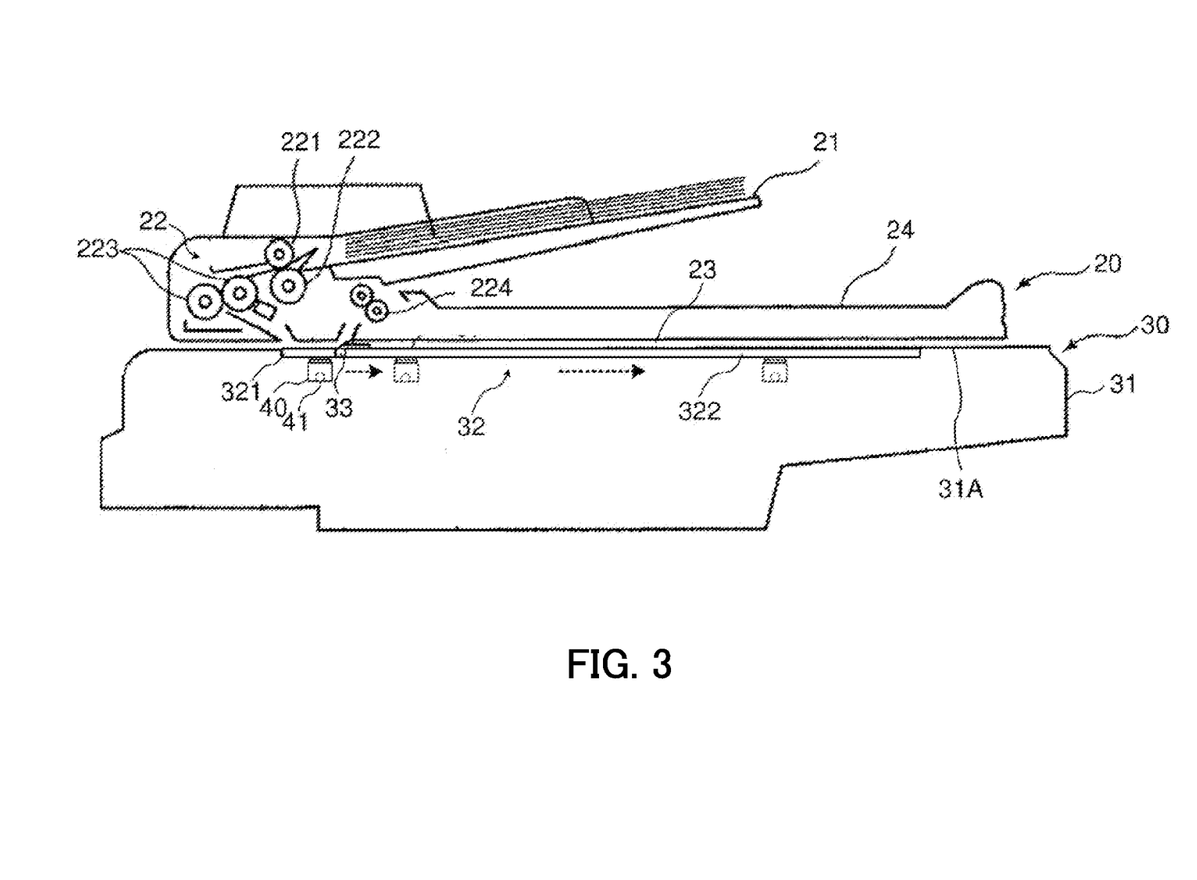
FIG. 3 is a cross sectional view illustrating a configuration of the image reading device according to one embodiment of the present disclosure.

FIG. 3 is a cross sectional view illustrating a configuration of the image reading device 10 according to one embodiment of the present disclosure. The image reading device 10 includes an image reading section 30 and a document conveyance section 20. The document conveyance section 20 is located above the image reading section 30.

The document conveyance section 20 includes a document loading table 21, a document conveying mechanism 22, a platen mat 23, and a document exit section 24. An original document is loaded on the document loading table 21. The document conveying mechanism 22 conveys the original document loaded on the document loading table 21. The original document that has undergone image reading is ejected onto the document exit section 24. The document conveying mechanism 22 includes a paper feed roller 221, a separation roll 222, a conveyance roller 223, and a paper delivery roller 224. The document conveying mechanism 22 feeds the original document loaded on the document loading table 21 on a sheet-by-sheet basis using the paper feed roller 221 and the separation roll 222 and conveys the fed original document to a contact glass 32, which will be described later, using the conveyance roller 223. The original document conveyed to the contact glass 32 is read by a reading unit 40, which will be described later. The document conveying mechanism 22 ejects the original document that has undergone image reading to the document exit section 24 using the paper delivery roller 224.

The document conveyance section 20 is openable and closable with respect to the main surface of the contact glass 32. The document conveyance section 20 functions also as a document pressing member. The document pressing member presses the original document loaded on the contact glass 32.

The image reading section 30 includes a casing 31, the contact glass 32, a document separating member 33, the reading unit 40, and a reading unit drive section 50 (see FIG. 2). The casing 31 has a surface 31A having an opening. The surface 31A faces the document conveyance section 20 serving as the document pressing member when the document conveyance section 20 is closed. The contact glass 32 is fitted into the opening. The contact glass 32 includes a first contact glass 321 and a second contact glass 322. The first contact glass 321 is used for conveying reading. The term, conveying reading means to read an original document while conveying it. The second contact glass 322 is used for stationary reading. The term, stationary reading means to read an original document while fixing it. The document separating member 33 is located between the first and second contact glasses 321 and 322. The document separating member 33 separates the original document having undergone reading by the reading unit 40 from the first contact glass 321 and ejects it.

The reading unit 40 is located on the side of the reverse surface of the contact glass 32. The reverse surface of the contact glass 32 is a surface opposite to the obverse surface of the contact glass 32. The obverse surface of the contact glass 32 receives loading of an original document. The reading unit 40 is movable in a sub-scanning direction. The reading unit drive section 50 includes a motor, a gear, etc. In stationary reading, the reading unit drive section 50 causes the reading unit 40 to reciprocally move in the sub-scanning direction. As a result, the original document loaded on the second contact glass 322 is read by the reading unit 40. By contrast, in conveying reading, the reading unit drive section 50 causes the reading unit 40 to be fixed at a predetermined position on the reverse surface of the first contact glass 321. The document conveyance section 20 then reads the original document being conveyed to the first contact glass 321.

The reading unit 40 includes a light emitting section 41 and a light receiving section (not illustrated). The light emitting section 41 may be a light emitting diode (LED), for example. The light receiving section may be a complementary metal oxide semiconductor (COMS) image sensor, for example. The light emitting section 41 of the reading unit 40 irradiates an original document that is a reading target with three color beams of red, green, and blue alternately. The light receiving section receives light of the light beams that is reflected by the original document. The light receiving section converts the received light to electric signals to acquire image data for one line in the main scanning direction. The image data is converted to digital signals by an A/D conversion section (not illustrated) and then undergoes image processing including shading correction, gamma correction, chromatic aberration, modulation transfer function (MTF) correction, scanner color correction, etc. Image data generated through the image processing is stored into an image memory and a hard disk drive (HDD). The A/D conversion section, the image memory, and the HDD are provided in the image forming apparatus 1.

Figure 4:
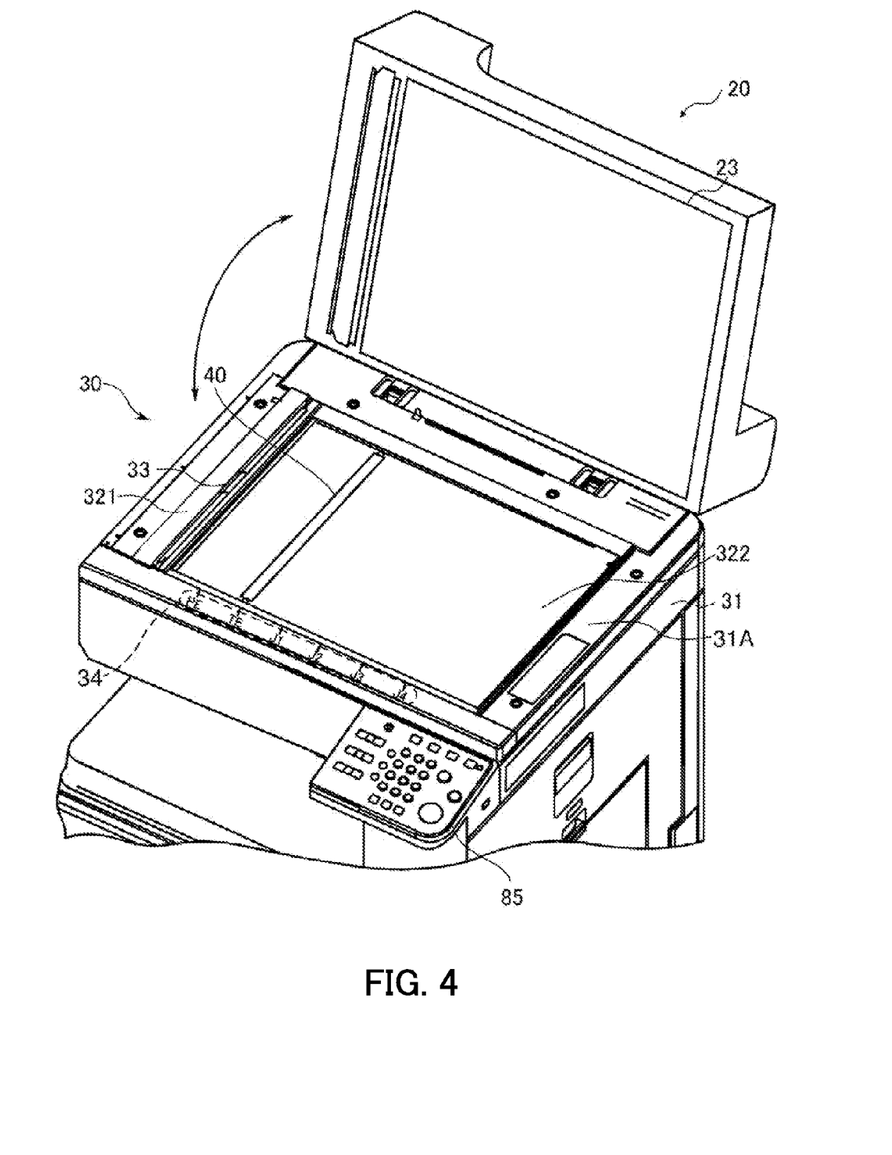
FIG. 4 is a perspective view illustrating an image reading section in a state in which a document conveyance section is opened according to one embodiment of the present disclosure.

FIG. 4 is a perspective view illustrating the image reading section 30 according to one embodiment of the present disclosure. FIG. 4 illustrates a state in which the document conveyance section 20 is opened. Characters or signs indicating status information items are inscribed on a portion 34 of the image reading section 30. Hereinafter, the characters and the signs are referred to correctively as symbols. The portion 34 is determined in advance to be located in the casing 31. The status information items each indicate a state of the image reading device 10 or the image forming apparatus 1. Examples of the status information items include a remaining paper information item, jam position information items, a remaining toner information item, etc. The remaining paper information item indicates an amount of remaining paper accommodated in the paper feed cassette of the paper feed section 82. The jam position information items each indicate a position of a jam occurring in the paper conveyance path. The remaining toner information item indicates an amount of remaining toner contained in the toner container of the image forming section 84. In the example illustrated in FIG. 4, plural symbols indicating the respective status information items are inscribed on respective portions in the portion 34 of a surface 31A of the casing 31. These points are spaced at regular intervals in the sub-scanning direction. In FIG. 4, a symbol "PE" represents a state in which paper is exhausted in the paper feed section 82 (paper empty), specifically, a state in which no paper or less amount of paper remains in the paper feed cassette of the paper feed section 82. "TE" represents a state in which toner is exhausted in the image forming section 84 (toner empty), specifically, a state in which no toner or less amount of toner remains in the toner container of the image forming section 84. "J" represents a state in which a jam occurs in the paper conveyance path. Numerals "1" to "4" appended to "J" each indicate a position of a jam occurring in the paper conveyance path.

Referring back to FIG. 2, the image forming apparatus 1 further includes the control unit 100. The control unit 100 includes a central processing unit (CPU), a random access memory (RAM), a read only memory (ROM), etc. The control unit 100 causes the CPU to execute control programs stored in the ROM, RAM, or the like to implement a control section 101, an operation control section 102, the acquiring section 103, and a receiving section 104. Note that each of the above elements that the control unit 100 implements may be constituted by a hardware circuit (i.e., a dedicated electronic circuit) rather than by the CPU that executes the control programs.

The control section 101 governs an overall operation of the image forming apparatus 1. The control section 101 is connected to the image reading device 10, the paper feed section 82, the paper conveyance section 83, the image forming section 84, the operation section 85, etc. The control section 101 performs operation control on each of the elements connected thereto and transmission and receipt of signals or data to and from each of the connected elements.

The acquiring section 103 acquires status information items each indicating a state of the image reading device 10 or the image forming apparatus 1. The image forming apparatus 1 is connected to the image reading device 10. Specifically, the acquiring section 103 acquires the status information items by acquiring signals output from the respective sensors (e.g., the remaining paper sensor 821, the jam sensors 831, and the remaining toner sensor 841) and analyzing the acquired signals.

The receiving section 104 receives an instruction to execute an image reading job and the like. Such an instruction to execute an image reading job and the like are input through operation on an operation key 851 or the like of the operation section 85.

The operation control section 102 controls a driving operation on the reading unit 40 by the reading unit drive section 50 and a light emitting operation by the light emitting section 41.

As described above, the image forming apparatus 1 is a multifunction peripheral having a plurality of functions. The image forming apparatus 1 uses a plurality of operation modes (e.g., an image forming mode for forming an image on paper and an image reading mode for reading an image of an original document). In execution of an image reading job during which the image forming apparatus 1 is set to the image reading mode as an operation mode, the operation control section 102 controls the reading unit drive section 50 to reciprocally move the reading unit 40 in the sub-scanning direction while controlling the light emitting section 41 to emit light. Through the above control, the operation control section 102 causes the reading unit 40 to read an image of the original document. By contrast, in non-execution of an image reading job in a situation in which the image forming apparatus 1 is not set to the image reading mode as an operation mode, the operation control section 102 controls the reading unit drive section 50 to move the reading unit 40 to a predetermined position and controls the light emitting section 41 to emit light while the reading unit is located at the predetermined position. Through the above control, the operation control section 102 notifies a user of a status information item acquired by the acquiring section 103. The following describes status information notifying processing in detail with reference to the flowchart of FIG. 5.

Figure 5:
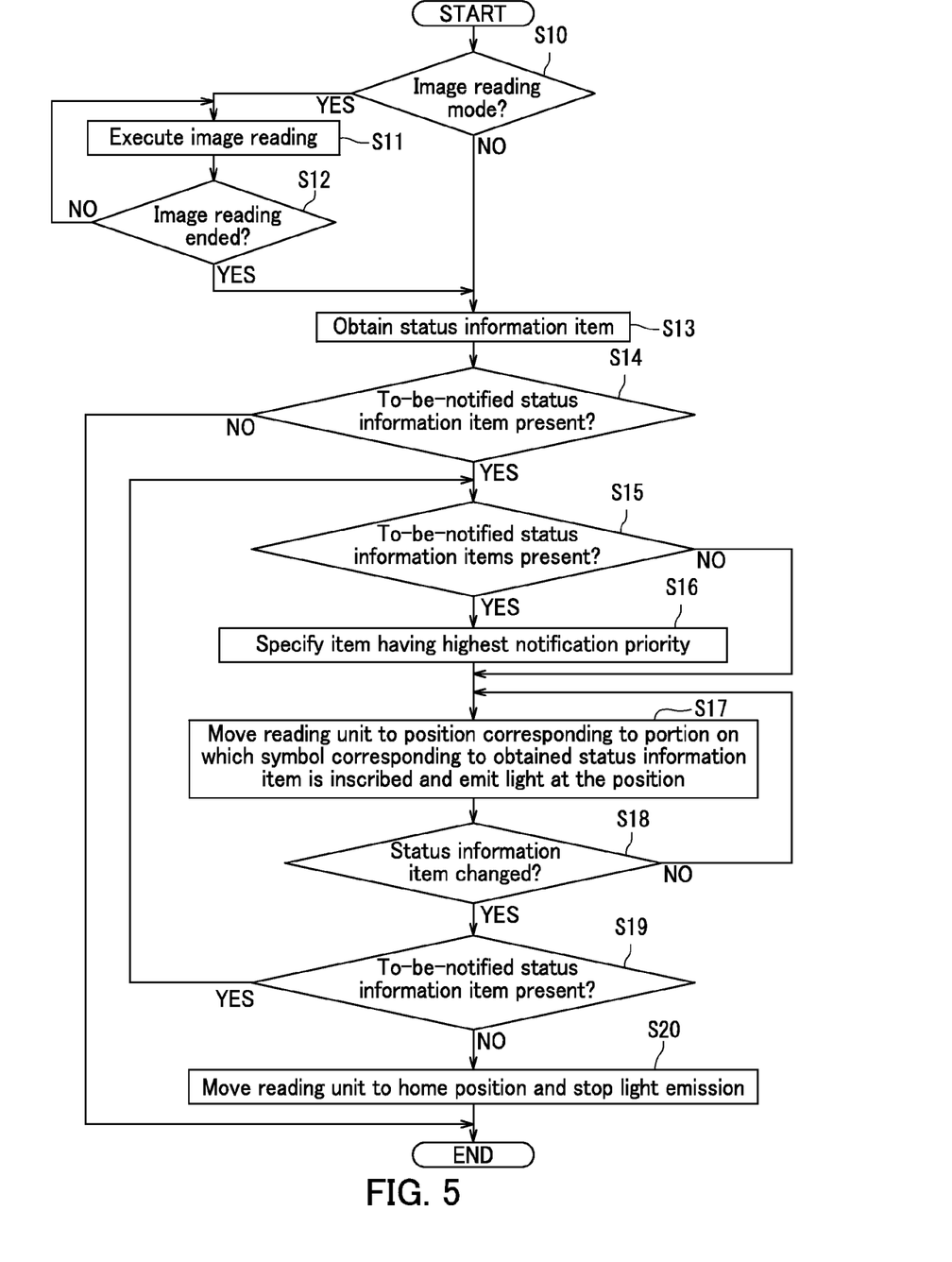
FIG. 5 is a flowchart depicting a flow of status information notifying processing performed by the image forming apparatus including the image reading device according to one embodiment of the present disclosure.

FIG. 5 is a flowchart depicting a flow of the status notification processing performed by the image forming apparatus 1 according to one embodiment of the present disclosure. The operation control section 102 of the image forming apparatus 1 determines whether or not the image forming apparatus 1 is set to the image reading mode as an operation mode (Step S10). The image forming apparatus 1 is turned into the image reading mode in response to the receiving section 104 receiving an instruction to execute an image reading job.

Upon determination that the image reading mode is not set as the operation mode (NO at Step S10), the image forming apparatus 1 performs processing at Step S13 and following steps. By contrast, upon determination that the image reading mode is set as the operation mode (YES at Step S10), the operation control section 102 executes image reading processing (Step S11). Then, the image reading processing is ended (YES at S12), and the image forming apparatus 1 is set into a non-image reading mode as an operation mode. The image forming apparatus 1 then performs processing at Step S13 and following steps.

At step S13, the acquiring section 103 acquires status information items each indicating a state of the image reading device 10 or the image forming apparatus 1 based on signals output from the remaining paper sensor 821 and the like.

The operation control section 102 then determines whether or not at least one status information items serving as a to-be-notified information item is present among the status information items acquired at Step S13 (Step S14). A status information item serving as a to-be-notified information item herein means an information item among the acquired status information items that indicates a symbol identical with that inscribed on a predetermined portion in the portion 34 of the casing 31 of the image reading section 30. In the example illustrated in FIG. 4, examples of the status information item serving as a to-be-notified information item includes error information items each indicating an error state (e.g., a paper exhaustion state, a toner exhaustion state, and a jam state).

For example, in a situation in which the acquiring section 103 acquires a status information item indicating that the amount of remaining paper in the paper feed cassette of the paper feed section 82 is not less than a predetermined amount, the operation control section 102 determines that the acquired status information item is not a status information item serving as a to-be-notified information item. By contrast, in a situation in which the acquiring section 103 acquires a status information item indicating that the amount of remaining paper in the paper feed cassette of the paper feed section 82 is less than the predetermined amount, the operation control section 102 determines the acquired status information item as a status information item serving as a to-be-notified information item.

Upon determination that no status information item serving as a to-be-notified information item is present (NO at Step S14), the image forming apparatus 1 terminates the status information notifying processing. By contrast, when at least one status information item serving as a to-be-notified information item is present (YES at Step S14), the operation control section 102 determines whether or not a plurality of status information items each serving as a to-be-notified information item is present (Step S15).

When a plurality of status information items each serving as a to-be-notified information item are present (YES at Step S15), a status information item having the highest notification priority is specified among the status information items each serving as a to-be-notified information item (Step S16). Each of the status information items has a predetermined notification priority. The notification priority herein means a priority in notification to a user. For example, a status information item indicating a jam state has a priority higher than status information items indicating paper exhaustion and toner exhaustion.

In response to determination that a single status information item serving as a to-be-notified information item is present (NO at Step S15) or specification of a status information item having the highest notification priority among the status information items each serving as a to-be-notified information item at Step S16, the operation control section 102 controls the reading unit drive section 50 to move the reading unit 40 to a position corresponding to a portion on which a symbol corresponding to the single status information item or the status information item having the highest notification priority is inscribed (Step S17). For example, in a situation in which a status information item indicating toner exhaustion is specified as the status information item having the highest notification priority among the status information items each serving as a to-be-notified information item, the operation control section 102 controls the reading unit drive section 50 to move the reading unit 40 to a position corresponding to a portion on which "TE" is inscribed, as illustrated in FIG. 4.

Further, the operation control section 102 controls the light emitting section 41 to emit light while the reading unit 40 is located at the corresponding position (Step S17). In the above configuration, a slight amount of light that is emitted from the light emitting section 41 leaks from a slit between the document conveyance section 20 and the image reading section 30 in a state in which the document conveyance section 20 is closed. The image forming apparatus 1 can notify a user of the presence of any status information item to be notified to the user through the leaking light. In a state in which the document conveyance section 20 is opened, the user can visually check the position of the reading unit 40, as illustrated in FIG. 4. This means that the image forming apparatus 1 can notify the user of a content of the status information item to be notified to the user. In the example illustrated in FIG. 4, the image forming apparatus 1 notifies the user of shortage of toner contained in the toner container.

Note that at Step S17, the operation control section 102 controls the light emitting section 41 to emit light less intense than light that the light emitting section 41 emits during execution of the image reading processing. In the above configuration, incidence of intense light to user's eyes can be prevented.

Further note that at Step S17, the operation control section 102 may control the light emitting section 41 to emit light from a part, rather than the entirety, of a light emitting region of the light emitting section 41. For example, the operation control section 102 controls the light emitting section 41 to emit light from an end part of the light emitting region of the light emitting section 41 in the main scanning direction that is located on a side of the portion on which the symbols indicating the status information items are inscribed. The above simple configuration not using a display section can ensure that a user is notified of a state of the apparatus, while reducing the amount of the light incident to the user's eyes.

The above processing can be expressed in other words as follows. The operation control section 102 controls the reading unit 40 to move to a position corresponding to a portion in which a symbol corresponding to a status information item and causes the light emitting section 41 to emit light (i.e., the operation control section 102 performs a notification operation). In the above situation, the light emitting section 41 emits light in a manner different from a manner by which the light emitting section 41 emits light in an image reading operation performed by the reading unit 40. Note that the notification operation is an operation to notify a user of a status information item. In the above configuration, during the notification operation, light is emitted in a manner different from that in the image reading operation. Accordingly, the image forming apparatus 1 can definitely notify a user that the image forming apparatus 1 performs the notification operation, rather than the image reading operation.

Subsequent to Step S17, the operation control section 102 determines whether or not any status information item acquired by the acquiring section 103 is changed (Step S18). When the status information item is changed (YES at Step S18) and no status information item serving as a to-be-notified information item remains (NO at Step S19), the operation control section 102 controls the reading unit drive section 50 to move the reading unit 40 to a home position and controls the light emitting section 41 to stop emitting light (Step S20). By contrast, when any status information item serving as a to-be-notified information item remains (YES at Step S19), the routine returns to Step S15 so that the operation control section 102 of the image forming apparatus 1 controls the reading unit drive section 50 to move the reading unit 40 to a position corresponding to a portion on which a symbol corresponding to the remaining status information item is inscribed (Step S17).

As described so far, when the configuration of the image reading device 10 and the image forming apparatus 1 according to one embodiment of the present disclosure is employed, an existing image reading device with no display section or even with a display section having a small size unsuitable for displaying status information can notify a user of a state of the apparatus without a need of additional illumination device (e.g., an LED) or the like. In other words, the image reading device 10 and the image forming apparatus 1 according to one embodiment of the present disclosure can notify a user of a state of the apparatus through a simple configuration using no display section.

Note that the present disclosure is not limited to the above embodiment and various variations can be made to the present disclosure.

<First Variation>

The operation control section 102 may adjust a light emitting manner of the light emitting section 41 according to the type of a status information item acquired by the acquiring section 103. For example, in the image reading device 10 and the image forming apparatus 1 according to a first variation, the operation control section 102 causes the light emitting section 41 to emit light intermittently when any information item among the acquired status information item indicates an error state. Examples of the error state herein include states of paper exhaustion, toner exhaustion, and a jam, for example. By contrast, the operation control section 102 cause the light emitting section 41 to emit light continuously when each of the acquired status information items indicates a normal state. The normal state herein means a state that is not an error state, for example, a state in which a predetermined number of sheets of paper or more remains in the paper feed cassette or a state in which a predetermined amount of toner or more remains in the toner container. In the above configuration, a user can confirm at a glance whether or not an error occurs in the image forming apparatus 1 or the image reading device 10. Thus, in the image reading device 10 and the image forming apparatus 1 in the first variation, a user can readily understand a type of a status information item.

Note that the operation control section 102 may adjust the light emitting manner of the light emitting section 41 according to the type of a status information item acquired by the acquiring section 103 through changing a light emitting region from which the light emitting section 41 emits light, changing color of the light emitted by the light emitting section 41, changing the intensity of the light emitted by the light emitting section 41, or the like.

<Second Variation>

In a situation in which a plurality of status information items each serving as a to-be-notified information item are present, the operation control section 102 controls the reading unit drive section 50 to move the reading unit 40 to a position corresponding to a portion on which a symbol corresponding to a status information item having the highest priority is inscribed on the above embodiment. However, the present disclosure is not limited to the above configuration. In a situation in which a plurality of status information items each serving as a to-be-notified information item are present, the operation control section 102 may control the reading unit drive section 50 to move the reading unit 40 in order to positions corresponding to portions on which the symbols corresponding to the status information items are inscribed.

<Third Variation>

Figure 6:
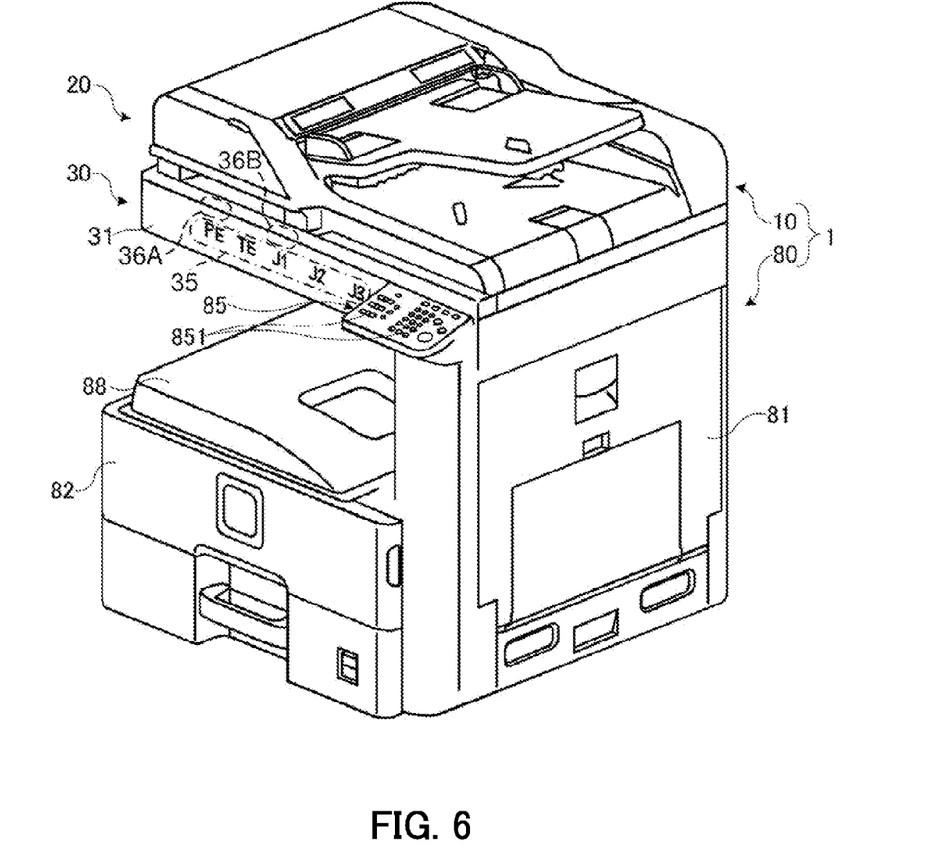
FIG. 6 is a perspective view illustrating an image forming apparatus including an image reading device according to a third variation.

FIG. 6 is a perspective view illustrating an image forming apparatus 1 including an image reading device 10 according to a third variation. In the image reading device 10 in the third variation, the symbols indicating the respective status information items are inscribed on a portion 35 of the casing 31. The portion 35 is determined in advance to be located in a front surface region of the casing 31. The front surface region of the casing 31 is not covered with the document conveyance section 20 in a state in which the document conveyance section 20 is closed. The status information items each indicate a state of the image reading device 10 or the image forming apparatus 1.

In a situation in which the reading unit 40 is located at a position corresponding to a portion on which a symbol corresponding to a status information item is inscribed, the light emitted from the light emitting section 41 leaks out of the vicinity of the portion on which the symbol corresponding to the status information item is inscribed in the image reading device 10 according to the third variation. For example, in a situation in which the reading unit 40 is located at a position corresponding to a portion on which "TE" is inscribed, the light emitted from the light emitting section 41 leaks out of a slit 36B between the document conveyance section 20 and the image reading section 30. Alternatively, in a situation in which the reading unit 40 is located at a position corresponding to a portion on which "PE" is inscribed, the light emitted from the light emitting section 41 leaks out of a slit 36A between the document conveyance section 20 and the image reading section 30. In the above configuration, even in a situation in which the document conveyance section 20 is closed, the content of a status information item can be notified to a user without need of a user opening the document conveyance section 20.

<Fourth Variation>

Figure 7:
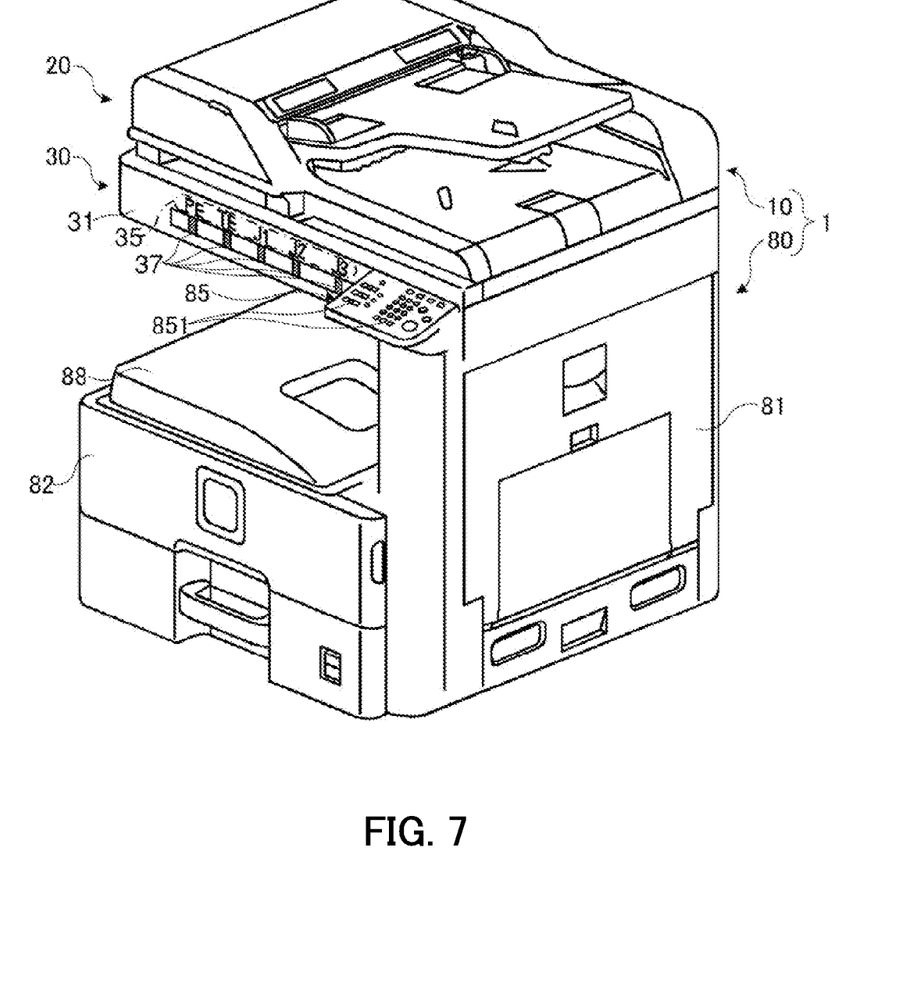
FIG. 7 is a perspective view illustrating an image forming apparatus including an image reading device according to a fourth variation.

FIG. 7 is a perspective view illustrating an image forming apparatus 1 including an image reading device 10 according to a fourth variation. The symbols corresponding to the respective status information items are inscribed on a portion 35 in a front surface region of the casing 31 in the image reading device 10 according to the fourth variation in the same way as in the third variation. The front surface region of the casing 31 is not covered with the document conveyance section 20 in a state in which the document conveyance section 20 is closed. The portion 35 is determined in advance to be located in the casing 31. The status information items each indicate a state of the image reading device 10 or the image forming apparatus 1.

The front surface region of the casing 31 has a plurality of openings 37. The openings 37 each allow part of light emitted by the light emitting section 41 to travel outside the device (e.g., the image reading device 10 or the image forming apparatus 1) in a situation in which the reading unit 40 is located at a predetermined position while the document conveyance section 20 is closed. As described as above, the symbols each corresponding to one of the status information items are inscribed on portions corresponding to parts in which the respective openings 37 are located. In the above configuration, even in a state in which the document conveyance section 20 is closed, the image reading device 10 and the image forming apparatus 1 in the fourth variation can notify a user of the content of a status information item without need of the user opening the document conveyance section 20 in the same way as in the third variation.

<Fifth Variation>

The contents of the respective status information items explained in the above embodiment each are an example. The present disclosure is not limited to the case with only these items. For example, in a situation in which a post processing device is connected to the image forming apparatus 1, a status information item indicating information on an amount of remaining staples may be included in the status information items. The staples are accommodated in a stapler of the post processing device.

What is claimed is:
1. An image reading device comprising:
a casing that constitutes an outer contour of the image reading device;
a contact glass on which an original document is loaded;
an openable and closable document pressing member located on one side of the contact glass;
a reading unit that is configured to be movable in a sub-scanning direction and located on an opposite side of the contact glass and that includes a LED configured to emit light toward the original document;

a reading unit drive section including a motor and configured to move the reading unit in the sub-scanning direction by the motor; and a control unit including a processor and a storage medium storing therein a computer program and configured to control an operation of the image reading device through the processor executing the control program, wherein the image reading device is connected to an apparatus main body of an image forming apparatus, the apparatus main body includes:
- a paper feed cassette that accommodates paper;
- an image forming section including a photosensitive drum and configured to forma an image on the paper by transferring a toner image formed on the photosensitive drum to the paper; and
- a paper conveyance section including a plurality of conveyance roller pairs and configured to drive to rotate the conveyance roller pairs for feeding the paper from the paper feed cassette toward the image forming section, the control unit includes:
- an operation control section configured to control a drive operation by the reading unit drive section and a light emitting operation by the LED; and
- an acquiring section configured to acquire a status information item indicating a state of the image reading device or the apparatus main body, the casing has a surface on which a plurality of symbols are inscribed such as to be spaced at regular intervals in the sub-scanning direction of the reading unit, the plurality of symbols indicate status information items different from each other, when the acquiring section acquires an status information item, the operation control section instructs the reading unit drive section to move to a position corresponding to the portion on which the symbol corresponding to the status information item is inscribed and instructs the LED to emit light while the reading unit is located at the position.

2. The image reading device according to claim 1, wherein the operation control section adjusts a light emitting manner of the LED according to a type of a status information item acquired by the acquiring section.

3. The image reading device according to claim 2, wherein the operation control section adjusts the light emitting manner through causing the LED to emit light continuously or intermittently.

4. The image reading device according to claim 1, wherein in a situation in which the operation control section controls the reading unit drive section to move the reading unit to the position corresponding to the portion on which the symbol is inscribed and controls the LED to emit light, the operation control section causes the LED to emit light in a manner different from a manner by which the LED emits light in an image reading operation performed by the reading unit.

5. The image reading device according to claim 4, wherein in a situation in which the operation control section controls the reading unit drive section to move the reading unit to the position corresponding to the portion on which the symbol is inscribed and controls the LED to emit light, the operation control section causes the LED to emit light in the different manner through reduction in intensity of the light emitted from the light emitting section compared to intensity of the light emitted from the LED in the image reading operation performed by the reading unit.

6. The image reading device according to claim 4, wherein in a situation in which the operation control section controls the reading unit drive section to move the reading unit to the position corresponding to the portion on which the symbol is inscribed and controls the LED to emit light, the operation control section causes the LED to emit light in the different manner through the LED emitting light from an end part of a light emitting region of the LED in the main scanning direction that is located on a side of the portion on which the symbol corresponding to the status information item is inscribed.

7. The image reading device according to claim 1, wherein the casing has an opening that allows part of the light emitted by the LED to travel outside the image reading device in a situation in which the reading unit is located at the corresponding position in a state while the document pressing member is closed, and the symbol corresponding to the status information item is inscribed on a portion of the casing corresponding to a part of the casing in which the opening is located.

8. The image reading device according to claim 1, wherein the operation control section controls the reading unit drive section to move the reading unit to the position corresponding to the portion on which the symbol corresponding to the status information item is inscribed while the reading unit does not perform an image reading operation.

9. The image reading device according to claim 1, wherein the acquiring section acquires as the status information item, at least one of an information item indicating an amount of paper remaining in the apparatus main body of the image forming apparatus connected to the image reading device, a status information item indicating an amount of toner remaining in the image forming apparatus, and an information item indicating occurrence of a paper jam and a position of the paper jam occurring in the image forming apparatus.

10. The image reading device according to claim 1, wherein
the status information item has predetermined notification priority, and
in a situation in which the acquiring section acquires a plurality of the status information items, the operation control section controls the reading unit drive section to move the reading unit to a position corresponding to a portion on which a symbol corresponding to a status information item having the highest notification priority among the status information items is inscribed.

11. The image reading device according to claim 1, wherein
in a state in which the document pressing member is closed, the light emitted from the LED leaks out of a slit between the document pressing member and the casing.

12. The image reading device according to claim 1, wherein
in a state in which the document pressing member is opened, a content of the status information item is notified to a user according to a position of the reading unit.

13. The image reading device according to claim 1, wherein
the operation control section adjusts a light emitting manner of the LED according to a type of a status information item acquired by the acquiring section through changing a light emitting region from which the LED, changing color of the light emitted by the LED, or changing intensity of the light emitted by the LED.

14. The image reading device according to claim 1, wherein
in a situation in which the acquiring section acquires a plurality of the status information items, the operation control section controls the reading unit drive section to move the reading unit in order to positions corresponding to portions on which symbols each corresponding to one of the status information items are inscribed.

15. The image reading device according to claim 1, wherein
the symbol is inscribed on a front surface region of the casing.

16. An image forming apparatus comprising:
the image reading device according to claim 1; and
an image forming section configured to form an image read by the image reading device onto paper, wherein
the acquiring section acquires a status information item indicating a state of the apparatus main body of the image forming apparatus in addition to the status information indicating a state of the image reading device.

* * * * *